United States Patent
Leung et al.

(10) Patent No.: US 12,373,578 B2
(45) Date of Patent: Jul. 29, 2025

(54) SECURE MULTI-PARTY COMPUTATION

(71) Applicant: Microsoft Technology Licensing, LLC, Redmond, WA (US)

(72) Inventors: Man Chun D. Leung, Daly City, CA (US); Saket Kumar, Mountain View, CA (US); Ryan T. Tecco, Philadelphia, PA (US); Jing Wang, Los Altos, CA (US); Ryan M. Rogers, Los Gatos, CA (US); Manoj R. Thakur, Santa Clara, CA (US); Devang N. Jhaveri, San Jose, CA (US); Sudhanshu Arora, Fremont, CA (US); Liangzhong Yin, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 287 days.

(21) Appl. No.: 17/993,661

(22) Filed: Nov. 23, 2022

(65) Prior Publication Data
US 2024/0169074 A1 May 23, 2024

(51) Int. Cl.
*H04L 9/00* (2022.01)
*G06F 21/53* (2013.01)
*G06F 21/60* (2013.01)

(52) U.S. Cl.
CPC ............ *G06F 21/602* (2013.01); *G06F 21/53* (2013.01); *G06F 2221/034* (2013.01)

(58) Field of Classification Search
CPC ... G06F 21/602; G06F 21/53; G06F 2221/034
See application file for complete search history.

(56) References Cited

U.S. PATENT DOCUMENTS

2022/0147650 A1* 5/2022 Seth ........................ H04L 9/14
2024/0220656 A1* 7/2024 Nozawa ................ G06F 21/602

OTHER PUBLICATIONS

Fox-Epstein, et al., "Private Join and Compute", Retrieved from: https://github.com/google/private-join-and-compute, Jul. 21, 2022, 5 Pages.
McCready, et al., "Confidential Computing on Azure", Retrieved from: https://docs.microsoft.com/en-us/azure/confidential-computing/overview-azure-products#azure-offerings, Aug. 31, 2022, 3 Pages.
Sengupta, et al., "Private-ID", Retrieved from: https://web.archive.org/web/20210510231149/https://github.com/facebookresearch/Private-ID, May 10, 2021, 4 Pages.

\* cited by examiner

*Primary Examiner* — Syed M Ahsan
(74) *Attorney, Agent, or Firm* — Nicholson De Vos Webster & Elliott LLP

(57) ABSTRACT

Technologies for secure multi-party computation include computing first double-encrypted data, computing second double-encrypted data, and, in a trusted execution environment, executing a query on the first double-encrypted data and the second double encrypted data to create a query-processed double-encrypted data set. The trusted execution environment can provide the query-processed double-encrypted data set to a requester such as another computer, system, or process.

20 Claims, 7 Drawing Sheets

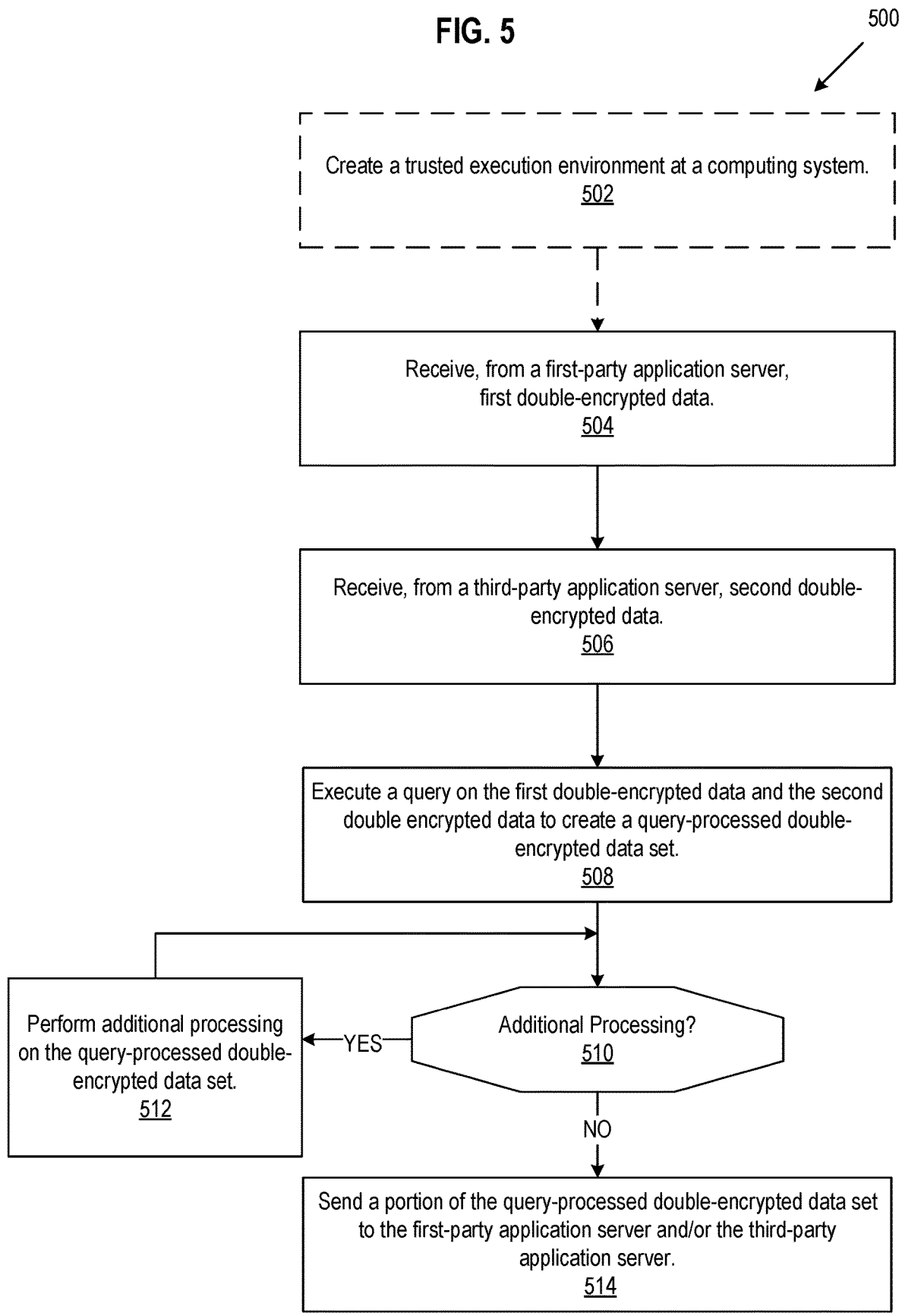

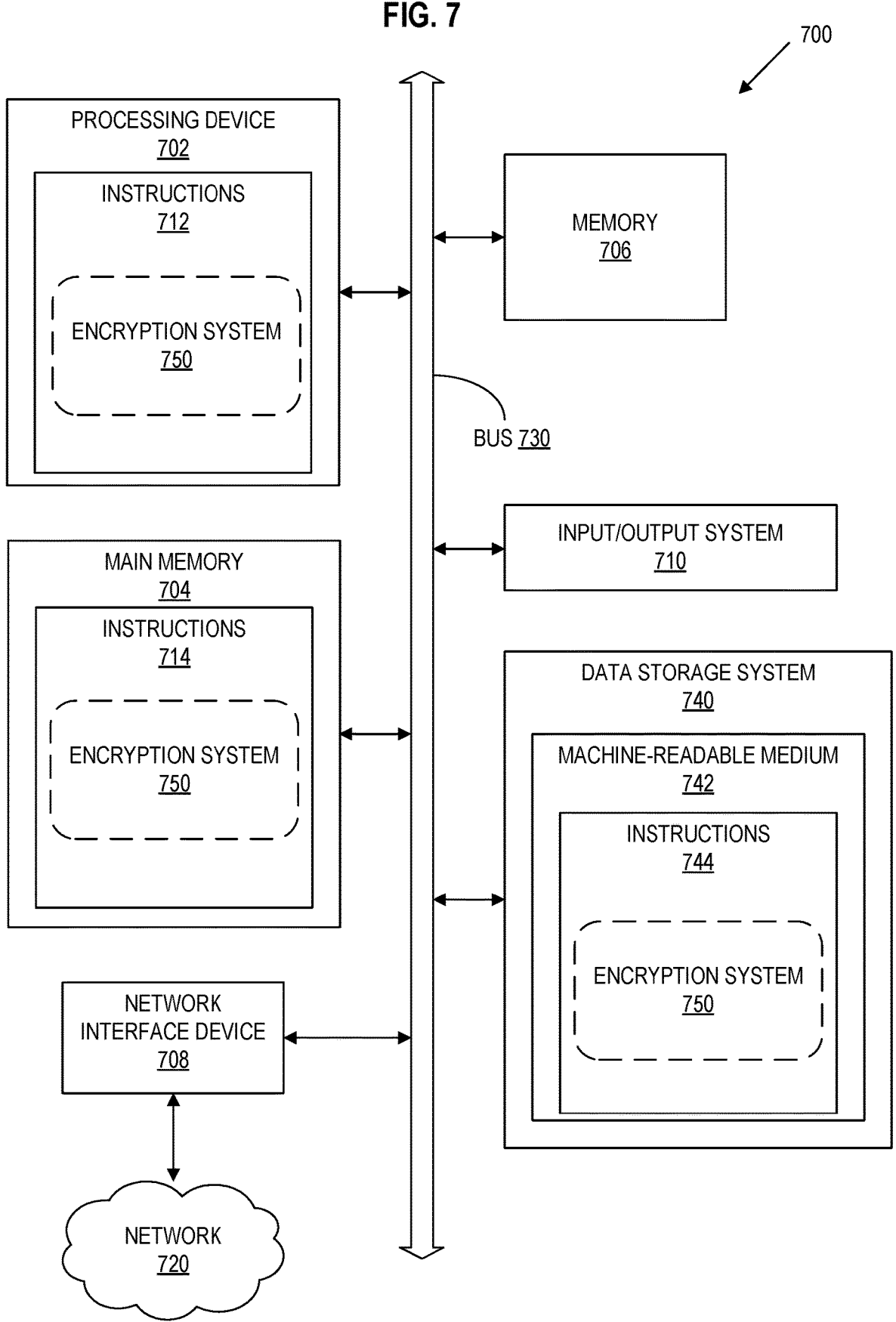

SECURE MULTI-PARTY COMPUTATION

TECHNICAL FIELD

A technical field to which the present disclosure relates is data security for multi-party computations. Another technical field to which the present disclosure relates is event attribution, including the use of event attribution data to control automated processes.

BACKGROUND

Software applications use web browsers or browser-based front ends to generate digital data in response to user inputs at user computing devices. Applications use computer networks to communicate the data to back end servers. Hundreds or even thousands of different software applications are available to hundreds of millions of user devices, through app stores, web sites, and other mechanisms. The widespread adoption of many different software applications has resulted in a proliferation of user data across many different cloud platforms.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5 is a flow diagram of an example method 500 for private multi-party computation in accordance with some embodiments of the present disclosure.

FIG. 7 is a block diagram of an example computer system 700 in which aspects of the present disclosure can operate.

DETAILED DESCRIPTION

Figure 1:
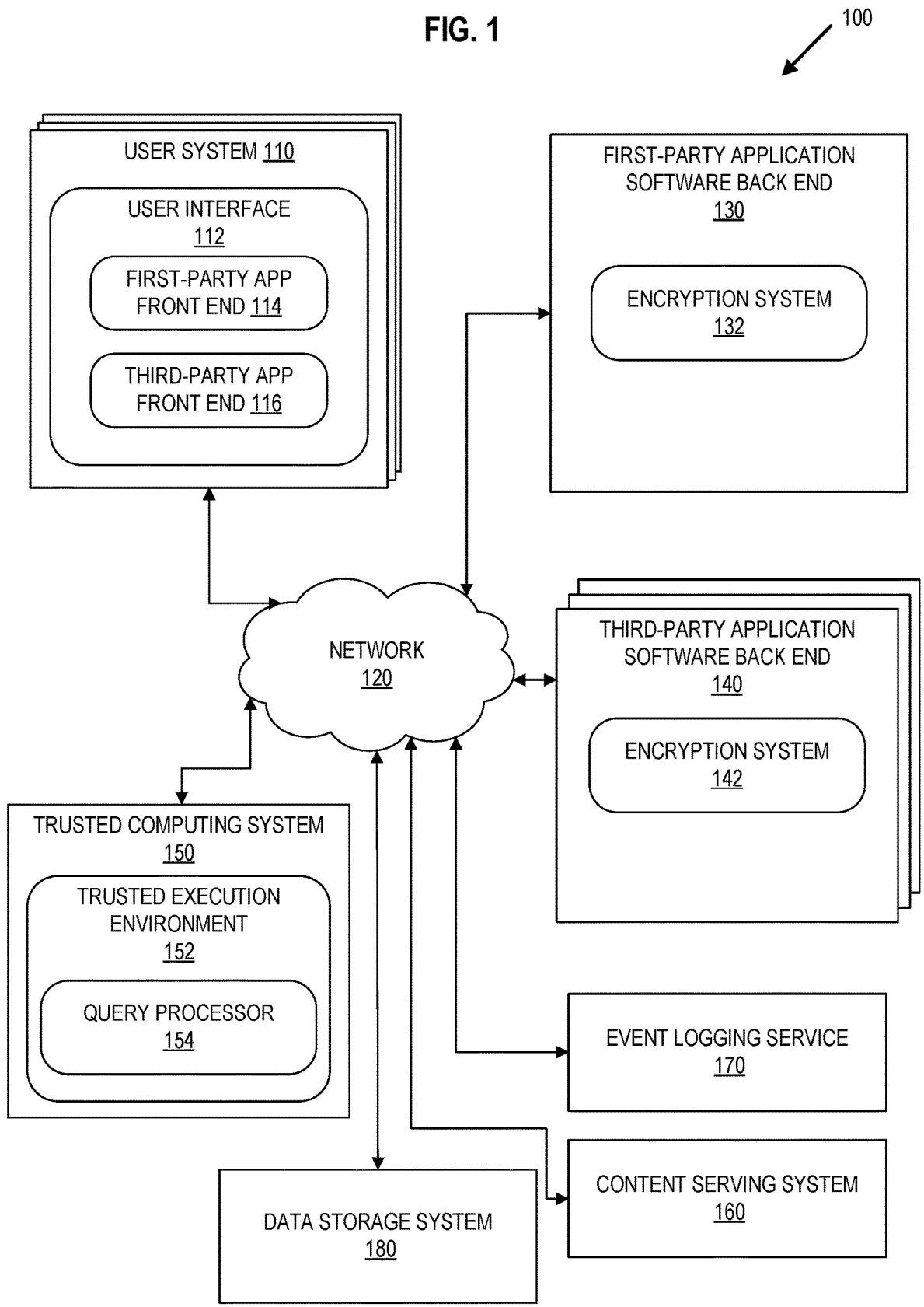
FIG. 1 illustrates an example computing system 100 that includes encryption systems and a trusted execution environment in accordance with some embodiments of the present disclosure.

Cloud platforms that host different software applications are often heterogenous. For example, two different software applications each hosted by a different cloud platform may be in use at the same user device at the same time or at different times. The variations in cloud architectures across different applications and service providers can make it challenging to implement cross-platform linking of user data. For example, different cloud platforms can be implemented using different database technologies, schemas, operating systems, or security protocols.

User data as used herein includes, for example, clicks, conversions, inputs into text boxes or online forms, selections of menu items, selections of options from a list of options, file uploads, file downloads, messages, notifications, and alerts. Click as used herein may refer to any action taken by a user with an input device that causes a signal to be received and processed by the user's device, including mouse clicks, taps on touchscreen display elements, voice commands, haptic inputs, gestures, and/or other forms of user input. Conversion as used herein may refer to an array or sequence of events, including user data, ad views, and clicks, that lead to an objective typically defined by a service provider or a platform, such as increasing website visits, optimizing user engagement, or increasing visibility, for example, brand awareness among users.

Another technical challenge is that rules, regulations, policies, or user preferences often restrict or prohibit cross-platform sharing of certain data, such as individual identifiers and other sensitive information, without the use of privacy-preserving mechanisms.

Despite these challenges, the ability to link related pieces of user data across software platforms has many benefits. In medical and healthcare contexts, the ability to link a user's two different test results maintained by two different platforms in an automated fashion can enable doctors or clinicians to see important correlations and insights that could improve treatment outcomes. In financial contexts, the ability to link a user's banking or credit histories across heterogenous banking or credit card platforms can help banks detect fraud or help the user understand and manage their finances at a macro level. In e-commerce and ad serving contexts, the ability to link information about a user's online activity history across heterogeneous online platforms can improve the relevance of content and product recommendations that are served to the user through a news feed, for example.

Accordingly, it is a technical challenge to facilitate cross-platform linking of user data while at the same time preserving privacy of users' individual identities and other access-restricted data.

Prior approaches have attempted to maintain privacy while aggregating user activity data across heterogenous systems through the use of browser-based trusted helpers. For example, in prior approaches, a trusted helper in the form of JavaScript code is installed in the browser to facilitate data collection, aggregation, and anonymization. In prior approaches, the trusted helpers have direct access to individual event level data records, and the role of a trusted helper is to perform aggregation and privatization of such data directly from web browsers so that the server can only receive anonymized results. Some of these prior approaches perform a masked reduce operation that interleaves fake data records with real data records, so that the trusted helpers cannot determine which data records are fake and not fake. However, in these prior approaches, it may be possible to filter out the interleaved records once the data reaches the server, meaning that the real data records can be determined at the server. For these and other reasons, the prior approaches have not yet been proven to be robust across many different use cases.

This disclosure provides technical solutions to the above-described challenges and other shortcomings of prior methods. In contrast to prior approaches, the disclosed technologies do not use trusted helpers at the browser level. For example, the disclosed technologies provide a hardware and/or software service, such as a trusted execution environment, which communicates directly with application software back end systems (e.g., servers) and does not communicate directly with the application front ends (e.g., browsers running on user devices).

The service, e.g., trusted execution environment, described is configured to perform query processing operations on double-encrypted data sets received from multiple different software application back ends. Double encryption techniques use, for example, homomorphic encryption, to ensure that the commutative properties of the encrypted ciphertext are met (i.e., to ensure that the order of encryption does not matter). The query processing operations performed in the trusted execution environment include joining a data set received from a first-party software application back end with a different data set received from a third-party software application back end using a double-encrypted identifier as the join key. Other query processing operations that can be optionally performed in the trusted execution environment include aggregations, such as multiplications and/or additions on value fields, labeling, masking, and differential privacy operations.

The double-encrypted identifier used as the join key is an individual identifier that is common to both the data set received from the first-party application back end and the data set received from the third-party application back end. For instance, a user may provide the same email address to both the first-party application and the third-party application as part of their respective login or registration procedures and the email address is stored in a data set at the first-party application back end and in another data set at the third-party application back-end, respectively. In this case, since the user's email address is the same in both the first-party data set and the third-party data set, it can be used as the join key.

To protect the privacy of the individual identifier used as the join key, the individual identifier is double-encrypted. For example, in a two-party private compute system, the individual identifier in the first-party data set is first encrypted at the first-party application system and then again at the third-party application system. Similarly, the individual identifier in the third-party data set is first encrypted at the third-party application system and then again at the first-party application system. The double encryption enables the first-party data set and the third party data set to be joined on the individual identifier without revealing the raw value of the individual identifier. Because the first party and the third party each use different private keys to do the encryption, the single encrypted identifiers will not match and therefore would be unusable as a join key. When the identifiers are both encrypted with both keys, regardless of the order in which the encryption operations are performed, the resulting double encrypted identifiers will match and can be used as the join key.

Some prior approaches determine the join key inferentially. That is, the unique identifier used to perform the cross-party join is not deterministic but rather computed non-deterministically based on other information in the data records, such as the user's temporal behavior or the interest categories of the user's engagements. The complexity of these computations can strain resource-constrained devices. In some implementations, the disclosed approach encrypts a deterministic individual identifier and uses the encrypted identifier as the join key to facilitate query processing by resource-constrained devices.

Aspects of the disclosed technologies are described in the context of online systems including online network-based digital content distribution. An example of a content distribution use case is the distribution of digital advertisements and recommendations for products and/or services through an online social network. However, aspects of the disclosed technologies are not limited to ads or recommendations distribution, but can be used to improve cross-platform data linking of medical or healthcare data, financial data, and other types of user data. Also, any network-based application software system can act as a content distribution system. For example, news, entertainment, and e-commerce apps installed on mobile devices, messaging systems, and social graph-based applications can all function as content distribution systems.

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example computing system 100 that includes encryption systems and a trusted execution environment in accordance with some embodiments of the present disclosure.

In the embodiment of FIG. 1, computing system 100 includes one or more user systems 110, a network 120, a first-party application software system 130, one or more third-party application software systems 140, a trusted computing system 150, a content serving system 160, an event logging service 170, and a data storage system 180.

As described in more detail below, user system 110 includes a first-party app front end 114 and a third-party app front end 116. First-party application software back end 130 includes an encryption system 132. Third-party application software back end 140 includes an encryption system 142. Trusted computing system 150 includes a trusted execution environment 152. Trusted execution environment 152 includes a query processor 154.

User system 110 includes at least one computing device, such as a personal computing device, a server, a mobile computing device, or a smart appliance. User system 110 includes at least one software application, including a user interface 112, installed on or accessible by a network to a computing device. User interface 112 is or includes first-party app front end 114, which is a front-end or client portion 114 of first-party application software system 130, and one or more third-party app front ends 116, which are front-end or client portions 116 of one or more third-party application software systems 140. For example, embodiments of user interface 112 include a graphical display screen that includes at least one slot. A slot as used herein refers to a space on a graphical display such as a web page or mobile device screen, into which digital content may be loaded for display to the user. The locations and dimensions of a particular slot on a screen are specified using, for example, a markup language such as HTML (Hypertext Markup Language). On a typical display screen, a slot is defined by two-dimensional coordinates. In other implementations such as virtual reality or augmented reality implementations, a slot may be defined using a three-dimensional coordinate system.

User interface 112 can be used to input data, initiate user interface events, and view or otherwise perceive output that includes data produced by first-party application software back end 130 and/or third-party application software back end 140. For example, user interface 112 can include a graphical user interface and/or a conversational voice/ speech interface that includes a mechanism for logging in to first-party application software system back end 130 through first-party app front end 114 or for logging in to third-party application software system back end 140 through third-party app front end 116, clicking or tapping on GUI elements, and interacting with digital content items of content distributions. Examples of user interface 112 include web browsers, command line interfaces, and mobile app front ends. User interface 112 as used herein can include application programming interfaces (APIs).

First-party application software back end 130 is a back end or server portion of any type of application software system that provides or enables the display of at least one form of digital content to user systems such as user system 110 through first-party app front end 114. Examples of first-party application software back end 130 include but are not limited to connections network software, such as social media platforms, and systems that are or are not based on connections network software, such as general-purpose search engines, specific-purpose search engines, job search software, recruiter search software, sales assistance software, content distribution software, learning and education software, e-commerce software, enterprise software, or any combination of any of the foregoing or other types of software.

First-party application as used herein may refer to a software application that is considered the owner of particular data or that has been granted permission by a user to use certain data, which is not a third-party software application. For example, an application that requires users to agree to a set of terms and conditions regarding data security may be considered a first-party application with respect to data created as a result of the users' use of the first-party application. Certain data owned or used by the first-party application is not owned by any third-party application and a third-party application may not have the same permission to use that data as the first-party application.

Third-party application as used herein may refer to a software application that is different than the first-party application in terms of its publisher, platform, or other considerations. A third-party application may refer to a software application that is considered the owner of particular data or that has been granted permission by a user to use certain data, which is not the first-party application. For example, an application that requires users to agree to a set of terms and conditions regarding data security may be considered a third-party application with respect to data created as a result of the users' use of the third-party application. Certain data owned or used by a third-party application is not owned by the first-party application and the first-party application may not have the same permission to use that data as the third-party application. An example of a third-party application is an application that is owned or operated by a third party entity that has entered into a business relationship with a first party entity that owns or operates the first-party application. For instance, a third party application could be an application that provides data and/or services to, through or on top of a first-party application, such as a data broker, a data aggregator, or a content distribution service.

Aspects of the disclosed technologies are described with reference to a first-party application and a third-party application. The techniques described are applicable to any number of third-party applications. For example, any of the one or more third-party application back ends 140 could maintain data sets that are capable of being joined with a data set of the first-party application. When there are multiple third-party applications, the trusted execution environment can pair the first-party application with each third-party application to create joined data sets either serially or in parallel.

Trusted computing system 150 is a "neutral" computing system that is physically and/or logically isolated from (e.g., by software and/or hardware) any of user system 110, first-party application software system back end 130, or third-party application software system back end 140. To the extent that any of content serving system 160, event logging service 170, or data storage system 180 are contained within a first-party application or a third-party application, trusted computing system 150 is also physically and/or logically isolated from content serving system 160, event logging service 170, or data storage system 180. For example, trusted computing system 150 is a cloud-based service provider such as a hosting service that is capable of hosting secure virtual machines.

In some implementations, trusted computing system 150 is owned and/or operated by an entity different from the first party or the third party but which may or may not be related contractually to or affiliated in the corporate sense with the first party or the third party, as the case may be. For instance, in some implementations, either the first party or the third party uses a confidential computing service provided by another entity, such as AZURE confidential computing, available from Microsoft Corporation, as the trusted computing system 150. In other implementations, trusted computing system 150 is, for example, a server or cluster owned and/or operated by the first party or the third party, but which has been specially configured to host trusted execution environment software. For example, either the first party or the third party can load data clean room software provided by another entity, such as HABU, onto one of its servers or clusters.

Trusted computing system 150 is configured with the amount of processing power, memory, and data storage needed to host trusted execution environment 152 and to enable query processor 154 to run in trusted execution environment 152. As such, the actual configuration of trusted computing system 150 is determined based on the requirements of a particular design or implementation of trusted execution environment 152 including query processor 154. Examples of trusted execution environments include secure virtual machines, memory-isolated operating systems, secure enclave images and data clean room software. For example, a secure virtual machine can provide secure in-memory processing of sensitive or access-restricted data.

Content serving system 160 is a data storage service, such as a web server, which stores digital content items and delivers digital content items to, for example, web sites and mobile apps or to particular slots of web sites or mobile app user interface display screens. The digital content items stored and distributed by content serving system 160 can contain various types of content, including medical or healthcare data, financial data, e-commerce data, advertisements, and recommendations, whether in text, image, audio, video, graphic, or multimedia form.

In some embodiments, content serving system 160 processes requests from, for example, first-party application software back end 130 or third-party application software back end 140, and distributes digital content items to user systems 110 in response to requests. A request is, for example, a network message such as an HTTP (HyperText Transfer Protocol) request for a transfer of data from an application front end to the application's back end, or from the application's back end to the front end. A request is formulated, e.g., by a browser at a user device, in connection with a user interface event such as a login, click or a page load. In some implementations, content serving system 160 is part of a first-party application software system back end 130 or a third-party application software system back end 140. In other implementations, content serving system 160 is owned and/or operated by another entity that is not the first party or the third party.

Event logging service 170 captures user interface events generated at the first-party application, such as page loads and clicks, in real time, and formulates the user interface events into a data stream that can be consumed by, for example, a stream processing system. The data stream generated by event logging service 170 includes, for example, one record of real-time event data for each user interface event that has occurred. While not specifically shown, a third-party application may utilize a similar logging service that performs similar functions as event logging service 170, however, the logging services used by the first-party application and any third-party application are not connected, but rather operate independently of each other, and do not share data with logging services of other parties.

In some implementations, event logging service 170 is a component of the first party application, and when a user of first-party app front end 114 clicks on a user interface element such as a content item, a link, or a control such as a view, comment, share, or reaction button, or loads a web page, or scrolls through a feed, etc., event logging service 170 fires an event to capture an identifier, an event type, a date/timestamp at which the user interface event occurred, and possibly other information about the user interface event, such as the impression portal and/or the impression channel involved in the user interface event (e.g., device type, operating system, etc.).

In other implementations, event logging service 170 (or a different but similar service) is a component of the third party application, and when a user of third-party app front end 116 clicks on a user interface element such as a content item, a link, or a control such as a view, comment, share, or reaction button, or loads a web page, or scrolls through a feed, etc., event logging service 170 fires an event to capture an identifier, an event type, a date/timestamp at which the user interface event occurred, and possibly other information about the user interface event, such as the impression portal and/or the impression channel involved in the user interface event (e.g., device type, operating system, etc.).

Time as used in the context of terminology such as real-time refers to a time delay introduced by the use of computer technology, e.g., by automated data processing and/or network transmission, where the time delay is the difference in time, as measured by a system clock, between the occurrence of an online event and the use of data processed in response to the event, such as for display, feedback, and/or control purposes. Real-time means, for example that the time delay between two events, or between an event and feedback, is not perceptible to the user or falls within a range of latency values that is acceptable to the user. For most users, a real-time latency value is in the range of milliseconds or less than one second. For some users, a real-time latency value is up to about three seconds.

Data storage system 180 includes data stores and/or data services that store digital content items, data received, used, manipulated, and produced by first-party application software back end 130 and/or third-party application system 140. Alternatively or in addition, data storage system 180 includes data stores and/or data services that store data received, used, manipulated, and produced by encryption system 132, encryption system 142, or trusted execution environment, including aggregated event data and encrypted data. In some embodiments, data storage system 180 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 180 can be configured to store data produced by real-time and/or offline (e.g., batch) data processing. A data store configured for real-time data processing can be referred to as a real-time data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

While not specifically shown, it should be understood that any of user system 110, first-party application software system back end 130, third-party application software back end 140, trusted computing system 150, content serving system 160, event logging service 170, and data storage system 180 includes an interface embodied as computer programming code stored in computer memory that when executed causes a computing device to enable bidirectional communication with any other of user system 110, first-party application software system back end 130, third-party application software back end 140, trusted computing system 150, content serving system 160, event logging service 170, and data storage system 180 using a communicative coupling mechanism. Examples of communicative coupling mechanisms include network interfaces, inter-process communication (IPC) interfaces and application program interfaces (APIs).

A client portion of a first-party application, e.g., first-party-app front end 114, and/or to client portion of a third-party application, e.g., third-party app front end 116, can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running first-party application software back end 130 can receive the input from the browser or first-party app front end 114, perform at least one operation using the input, and return output to the browser or first-party app front end 114 using an HTTP response that the web browser receives and processes. Similarly, a server running third-party application software back end 140 can receive input from a browser or a third-party app front end, perform at least one operation using the input, and return output to the browser or third-party app front end using an HTTP response that the web browser receives and processes.

Each of user system 110, first-party application software system back end 130, third-party application software back end 140, trusted computing system 150, content serving system 160, event logging service 170, and data storage system 180 is implemented using at least one computing device that is communicatively coupled to electronic communications network 120. Any of first-party application software system back end 130, third-party application software back end 140, trusted computing system 150, content serving system 160, event logging service 170, and data storage system 180 can be bidirectionally communicatively coupled by network 120. User system 110 as well as other different user systems (not shown) can be bidirectionally communicatively coupled to first-party application software system back end 130 and/or third-party application software back end 140.

A typical user of user system 110 can be an administrator or end user of first-party app front end 114, third-party app front end 116, first-party application software system back end 130, third-party application software back end 140 and/or content serving system 160. User system 110 is configured to communicate bidirectionally with any of first-party application software system back end 130, third-party application software back end 140 and/or content serving system 160 over network 120.

The features and functionality of user system 110, first-party application software system back end 130, third-party application software back end 140, trusted computing system 150, content serving system 160, event logging service 170, and data storage system 180 are implemented using computer software, hardware, or software and hardware, and can include combinations of automated functionality, data structures, and digital data, which are represented schematically in the figures. User system 110, first-party application software system back end 130, third-party application software back end 140, trusted computing system 150, content serving system 160, event logging service 170, and data storage system 180 are shown as separate elements in FIG. 1 for ease of discussion but, except as otherwise described, the illustration is not meant to imply that separation of these elements is required. The illustrated systems, services, and data stores (or their functionality) of each of user system 110, first-party application software system back end 130, third-party application software back end 140, content serving system 160, event logging service 170, and data storage system 180 can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Figure 6:
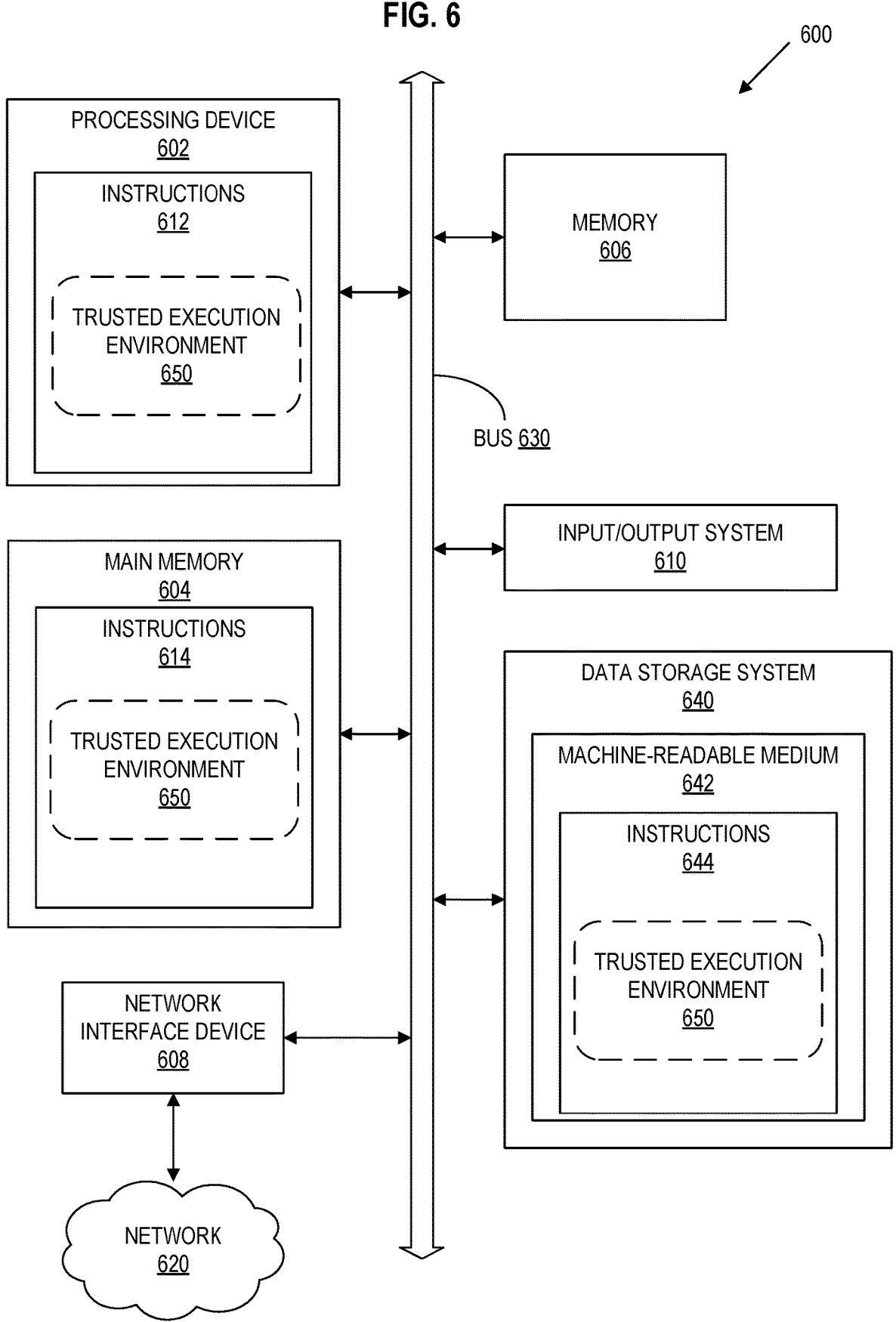
FIG. 6 is a block diagram of an example computer system 600 in which aspects of the present disclosure can operate.

For ease of discussion, in FIG. 6, the trusted execution environment 152 is represented as trusted execution environment 650. In FIG. 7, encryption system 750 represents encryption system 132 when computing system 700 is part of first-party application software system back end 130. Encryption system 750 represents encryption system 142 when computing system 700 is part of third-party application software back end 140. Trusted execution environment 650 and encryption system 750 are each implemented as instructions stored in a memory, and a processing device 602 or 702, as the case may be, is configured to execute the instructions stored in the memory to perform the operations described herein.

Further details with regard to the operations of the encryption systems 132, 142 and the trusted execution environment 152 are described below.

Figure 2:
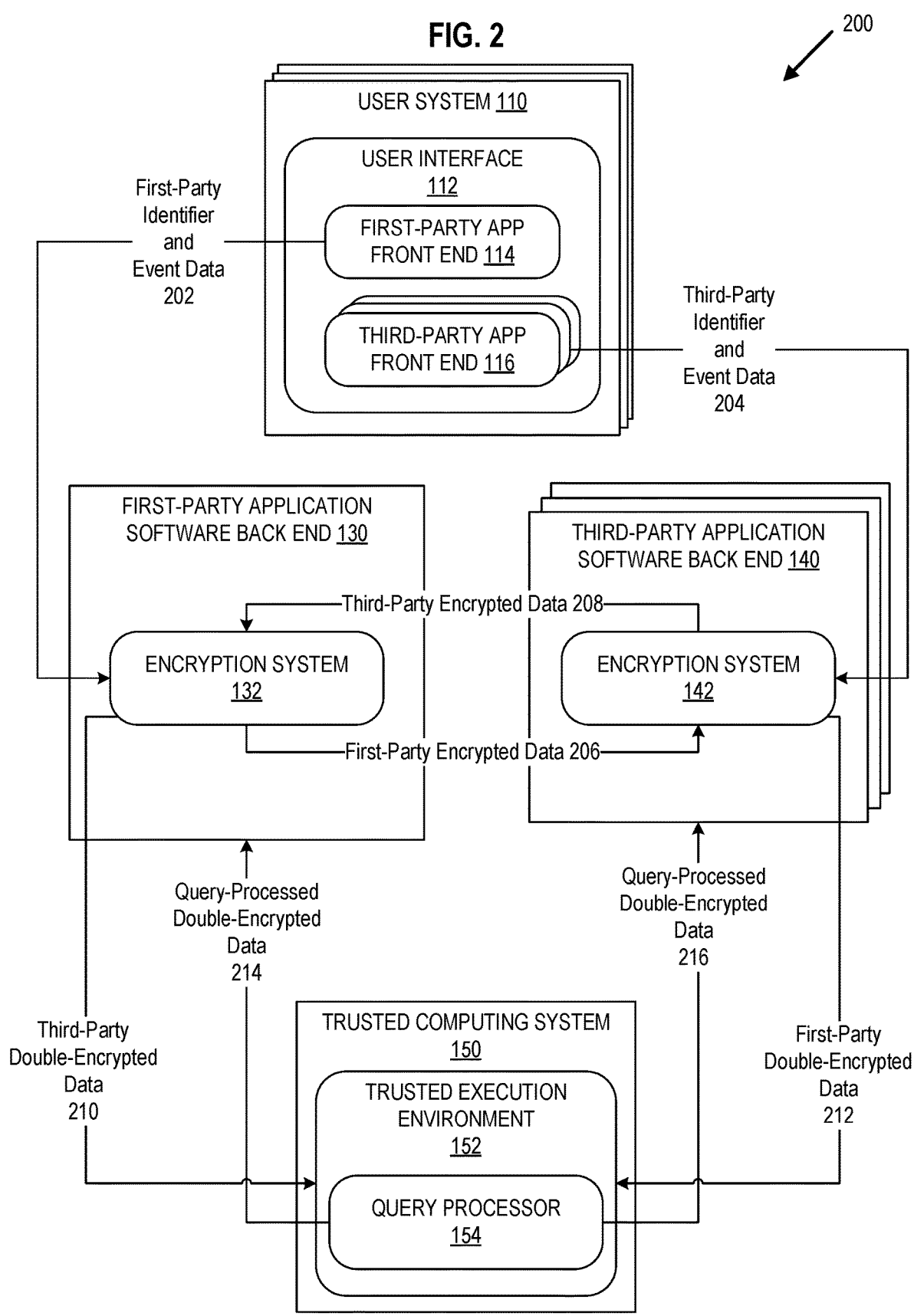
FIG. 2 is a flow diagram of an example method 200 for private multi-party computation in accordance with some embodiments of the present disclosure.

FIG. 2 is a flow diagram of an example method 200 for private multi-party computation in accordance with some embodiments of the present disclosure.

The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by various components of the computing system 100 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, processes can be omitted in various embodiments. Thus, not all processes are required in every embodiment. Other process flows are possible.

As shown in FIG. 2, the method 200 includes preliminary processes by which first-party application software back end 130 and third-party application software back end 140 receive identifier and event data 202, 204, respectively, from their respective front ends 114, 116 of various user systems 110. For example, a back end data store of first-party application software back end 130 receives and stores first-party identifier and event data 202, from time to time, over a time interval. Similarly, a back end data store of third-party application software back end 140 receives and stores third-party identifier and event data 204, from time to time, over a time interval. Examples of identifier data include identifiers that can be used to identify individual users individually, such as email addresses, hashed email addresses, and network addresses such as internet protocol (IP) addresses.

Examples of event data include various types of click data captured by first-party app front end 114 and third-party app front end 116, respectively, and associated timestamp data. Event data can include some data that is not access-restricted and does not need to be encrypted. For example, an identifier of a content item, e.g., a content identifier, or an identifier of an ad campaign associated with a click (e.g., a campaign identifier) may not need to be encrypted as long as the individual identifier is encrypted. Also, a group-level identifier associated with a click, such as a geographic region, job title, or topic, may not need to be encrypted, as long as the individual identifier is encrypted. Additionally, the timestamp data associated with a click may not need to be encrypted, as long as the individual identifier is encrypted.

First-party application software back end 130 stores each instance of first-party identifier and event data 202 received from first-party app front end 114 in a separate data record, such that each data record stored at first-party application software back end 130 pertains to a different user interface event communicated by first-party app front end 114 to first-party application software system back end 130 for the user identified by the first-party identifier in the data record. Similarly, third-party application software back end 140 stores each instance of third-party identifier and event data 204 received from third-party app front end 116 in a separate data record, such that each data record stored at third-party application software back end 140 pertains to a different user interface event communicated by third-party app front end 116 to third-party application software back end 140 for the user identified by the third-party identifier in the data record.

At least some of the data records stored at first-party application software back end 130 have a value of the first-party identifier that deterministically corresponds to a value of the third-party identifier of at least some of the data records stored at third-party application software back end 140. Likewise, at least some of the data records stored at third-party application software back end 140 have a value of the third-party identifier that deterministically corresponds to a value of the first-party identifier of at least some of the data records stored at first-party application software back end 130.

A server of first-party application software back end 130 applies encryption system 132 to the data records containing first-party identifier and event data 202 stored at the first-party application software back end 130. Encryption system 132 encrypts the first-party identifier and event data 202 a first time and outputs first-party encrypted data 206. First-party encrypted data 206 is communicated to encryption system 142 of third-party application software back end 140.

In some implementations, encryption system 132 only encrypts the individual identifier data and does not encrypt the associated event data, to conserve computing resources or run more efficiently on resource-constrained devices. In other implementations, encryption system 132 encrypts both the individual identifier data and at least some of the associated event data. For example, encryption system 132 encrypts the individual identifier and an associated group-level identifier but does not encrypt an associated content identifier or timestamp.

Similarly, a server of third-party application software back end 140 applies encryption system 142 to the data records containing third-party identifier and event data 204 stored at the third-party application software back end 140. Encryption system 142 encrypts the third-party identifier and event data 204 a first time and outputs third-party encrypted data 208. Third-party encrypted data 208 is communicated to encryption system 132 of first-party application software back end 130.

In some implementations, only the individual identifier data (and not the associated event data) is input to encryption system 142, such that encryption system 142 only encrypts the individual identifier data and does not encrypt the associated event data. This helps to conserve computing resources and enables encryption system 142 to run more efficiently on resource-constrained devices. In other implementations, both the individual identifier data and at least some of the associated event data are input into encryption system 142 and encryption system 142 encrypts both the individual identifier data and at least some of the associated event data. For example, encryption system 142 encrypts the individual identifier and an associated group-level identifier but does not encrypt an associated content identifier or timestamp.

Encryption system 132 encrypts third-party encrypted data 208 a second time and outputs third-party double-encrypted data 210. Third-party double-encrypted data 210 is communicated by first-party application software back end 130 into trusted execution environment 152 of trusted computing system 150. Likewise, encryption system 142 encrypts first-party encrypted data 206 a second time and outputs first-party double-encrypted data 212. First-party double-encrypted data 212 is communicated by third-party application software back end 140 into trusted execution environment 152 of trusted computing system 150.

On the second round of encryption, encryption systems 132, 142 each operate in a similar manner as in the first round. For example, encryption systems 132, 142 only double-encrypt the individual identifier data and do not double-encrypt the associated event data, in some implementations. In other implementations, encryption systems 132, 142 double-encrypt both the individual identifier data and at least some of the associated event data.

To encrypt first-party identifier and event data 202, encryption system 132 uses a commutative cipher and a private key that is securely stored at first-party application software back end 130. An example of a commutative cipher is a commutative exponentiation cipher. An example of a commutative exponentiation cipher is the Pohlig-Hellman cipher or another cipher that has a Decisional Diffie-Hellman computational hardness assumption. Encryption system 132 uses the same commutative cipher to double-encrypt third-party encrypted data 208.

Similarly, to encrypt third-party identifier and event data 204, encryption system 142 uses a commutative cipher and a private key that is securely stored at third-party application software back end 140. Encryption system 142 uses the same commutative cipher to double-encrypt first-party encrypted data 206. Encryption systems 132, 142 both use the same commutative cipher but with different private keys. Examples of processes performed by encryption systems 132, 142 are shown in more detail in FIG. 4A and FIG. 4B, described below.

In the illustrated implementation, a query processor 154 is hosted in trusted execution environment 152. Trusted execution environment 152 is a secure, neutral software and/or hardware execution environment configured to run join logic and query processing on encrypted un-identifiable data; i.e., data that cannot be validly traced back to an individual user identifier, such as the double-encrypted individual identifier. An example of join logic is join logic 306, described below with reference to FIG. 3. Trusted execution environment 152 performs the join logic and optionally, one or more other query processing techniques such as aggregation, privatization, or masking. The trusted execution environment 152 is made secure by, for example, hardware-based security guarantees against data access and tampering of code, which are provided by trusted computing system 150.

Trusted execution environment 152 receives third-party double-encrypted data 210 from first-party application software back end 130. Trusted execution environment 152 receives first-party double-encrypted data 212 from third-party application software back end 140.

Trusted execution environment 152 applies query processor 154 to third-party double-encrypted data 210 and first-party double-encrypted data 212. Examples of processes performed by query processor 154 are shown in more detail in FIG. 3 and FIG. 5, described below.

Trusted execution environment 152 generates query-processed double-encrypted data 214 and query-processed double-encrypted data 216 based on the output of query processor 154. The query-processed double-encrypted data 214 and the query-processed double-encrypted data 216 produced by query processor 154 can be duplicate copies of the same data set, such as a joined data set that contains privacy-protected portions of third-party double encrypted data 210 and portions of first-party double-encrypted data 212.

Trusted execution environment 152 communicates query-processed double-encrypted data 214 to first-party application software back end 130. Trusted execution environment 152 communicates query-processed double-encrypted data 216 to third-party application software back end 140. Examples of processes performed by trusted execution environment 152 and query processor 154 are shown in more detail in FIG. 3 and FIG. 5, described below.

Figure 3:
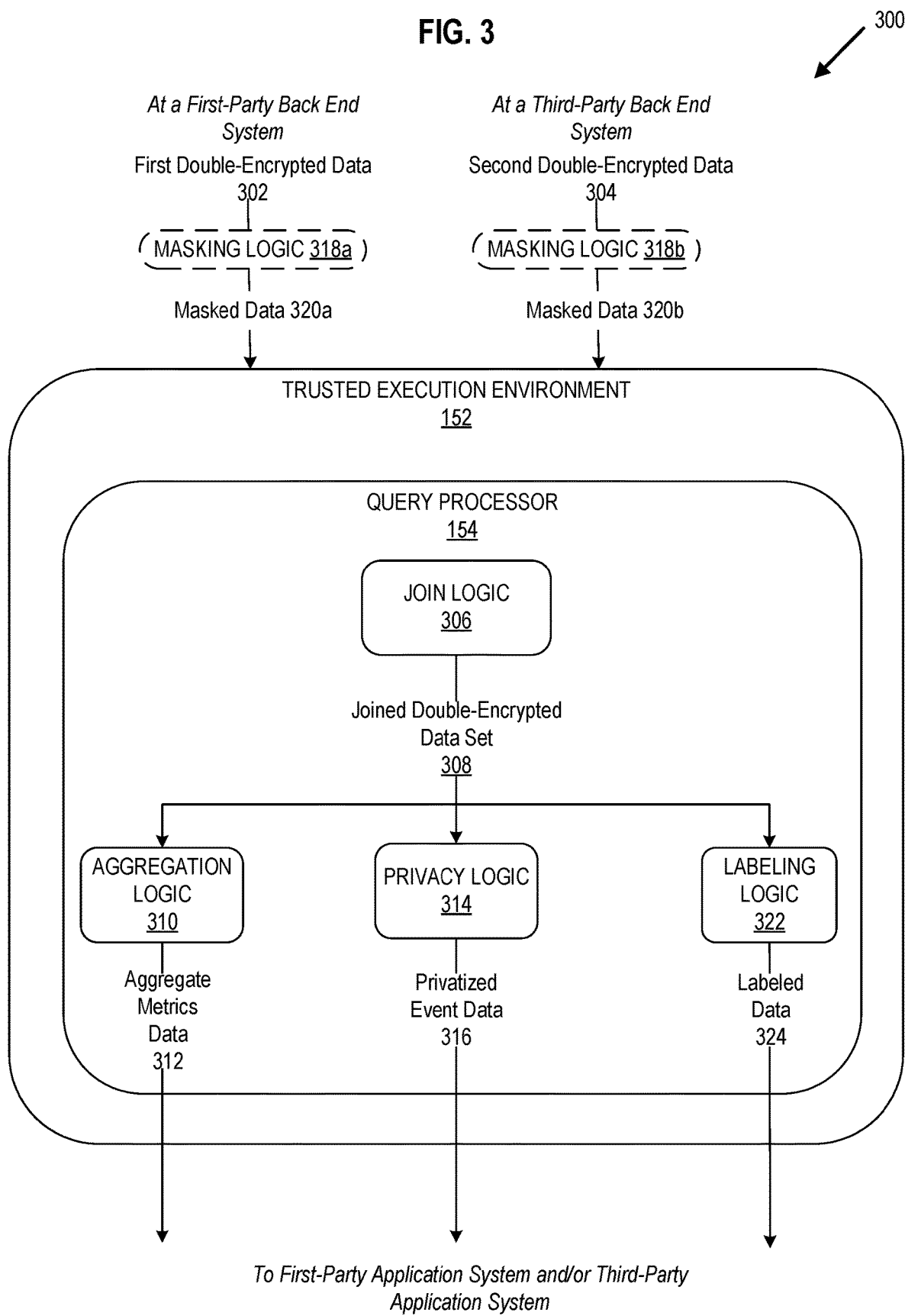
FIG. 3 is a flow diagram of an example method 300 to implement a trusted execution environment for a private multi-party computation in accordance with some embodiments of the present disclosure.

FIG. 3 is a flow diagram of an example method 300 to implement a service, such as a trusted execution environment, for a private multi-party computation in accordance with some embodiments of the present disclosure.

The method 300 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the trusted computing system 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 3, trusted execution environment 152 receives first double-encrypted data 302 from a first-party back end system such as back end system 130 and receives second double-encrypted data 304 from a third-party back end system such as back end system 140. In some implementations, either or both of the first-party system or the third-party system includes masking logic 318a, 318b, which the system applies to the double-encrypted data 302, 304, as the case may be, to produce corresponding masked data 320a, 320b, and the masked data 320a, 320b is sent to trusted execution environment 152 instead of the (unmasked) double-encrypted data. Dashed lines are used in FIG. 3 to illustrate that masking logic 318a, 318b are optional, i.e., included in some implementations but omitted in other implementations. Masking logic 318a, 318b is described in more detail below.

In some implementations, the first-party back end system and the third-party back end system each use a custom protocol to send first double-encrypted data 302 and second double-encrypted data 304, respectively, into the trusted execution environment 152. The custom protocol can be implemented using, for example, a browser-side lightweight JavaScript code or a server-side log transfer. The server-side log transfer can be implemented using a monitoring service for cloud resources and applications running in the cloud.

Within trusted execution environment 152, query processor 154 is applied to first double-encrypted data 302 and second double-encrypted data 304. In the implementation of FIG. 3, query processor 154 includes join logic 306, aggregation logic 310, and privacy logic 314. Other operations that can be performed inside trusted execution environment 152 include attribution logic to, for example, determine, at the individual identifier level, the user's first or last engagement with a particular first-party system or third-party system, and filtering logic to discard (i.e., remove from the data record) the double-encrypted identity data after a join has been performed.

Symbolically, the set of queries and operations performed within trusted execution environment 152 can be represented as $s_i = \oplus(u_{enc\_ab}, M_a, M_b)$, where $s_i$ denotes a particular ith query or operation s, $\oplus$ denotes the particular logic or special-defined operator applied to the set of inputs ($u_{enc\_ab}$, $M_a$, $M_b$) to perform $s_i$, $u_{enc\_ab}$ is a particular instance of a double-encrypted individual identifier, $M_a$ is a set of event data (e.g., non-private event metadata) associated with $u_{enc\_ab}$ by a first-party system a, and $M_b$ is a set of event data (e.g., non-private event metadata) associated with $u_{enc\_ab}$ by a third-party system b.

Join logic 306 performs a join operation on first double-encrypted data 302 and second double-encrypted data 304 using a join key to produce joined double-encrypted data set 308. To join first double-encrypted data 302 and second double-encrypted data 304, join logic 306 uses a double-encrypted identifier that is common to both first double-encrypted data 302 and second double-encrypted data 304 as the join key.

A join operation is a database operation that establish a link or connection between two or more database tables based on matching columns, thereby creating a relationship between the tables. The join operation can combine rows of data from multiple different tables into a new table based on the matching columns. Terminology such as tables and columns is not intended to be limited to a particular type of database implementation. For example, table as used herein may refer to a database table, graph, data store, file, or other form of data structure, and column as used herein may refer to a database column, field, value, or other form of data.

Continuing the above example, join logic 306 uses $u_{enc\_ab}$ as the join key to operate on $M_a$ and $M_b$ pairs, and through a set of post-join queries and transformations, produces s=operations ($s_1$, $s_2$, $s_3$, . . . ). For instance, $s_1$ is an event-level attribution operation (e.g., an operation that maps event data to identifier data, $s_2$ is a frequency count operation (e.g., an operation that computes how frequently a user clicked on content items, and $s_3$ is an aggregate operation that produces aggregate-level conversion results (e.g., for a group of users, a count of the number of conversions by users in that group). In an event-level attribution operation, $s_1$ is defined to aggregate events across individual $u_{enc\_ab}$ keys to produce an array of event data particular to those keys, i.e., $[M_{a1}, M_{a2}, M_{a3}, \ldots]$.

An attribution model such as a last touch model can resolve which $M_{a\_j}$ to select as the conversion outcome for a single $M_b$. For frequency count operations, the operation $s_2$ is a cardinality set operation based on the unique $u_{enc\_ab}$ present, i.e., $|u_{enc\_ab}|$. The operation $s_2$ performs an overlap analysis on unique encrypted keys. The $s_3$ operations are, for example, aggregate sum operations that operate on dimensions within $M_b$, such as campaign ID, day of the year, or other non-private measurable dimensions. In some implementations, there are multiple $s_3$ operations needed to generate meaningful reports, where each $s_3$ operation is applied independently. In some examples, $s_3$ operations are applied on top of $s_1$ (attribution) (e.g., $s_3$ operations are applied to output of an $s_1$ operation).

Tables 1, 2, and 3 below illustrate a simplified example of a join operation that may be performed by join logic 306.

TABLE 1

Example of First-party Data Set.
First-party Data Set

| Identifier | Event Data [content identifier, click value, timestamp] |
|---|---|
| EncrFP.ID1 | [ContentID12, 1, t1] |
| EncrFP.ID1 | [ContentID25, 0, t2] |
| EncrFP.ID2 | [ContentID12, 1, t3] |
| EncrFP.ID3 | [ContentID19, 1, t4] |

TABLE 2

Example of Third-party Data Set.
Third-party Data Set

| Identifier | Event Data [content identifier, click value, timestamp] |
|---|---|
| EncrTP.ID1 | [ContentID33, 0, t4] |
| EncrTP.ID1 | [ContentID64, 0, t5] |
| EncrTP.ID2 | [ContentID64, 1, t6] |

TABLE 3

Example Joined Data Set.
Joined Data Set

| Identifier | First-party Event Data | Third-party Event Data |
|---|---|---|
| EncrFP.TP.ID1 | [(ContentID12, 1, t1), (ContentID25, 0, t2)] | [(ContentID33, 0, t4), (ContentID64, 0, t5)] |
| EncrFP.TP.ID2 | [ContentID12, 1, t3] | [ContentID64, 1, t6] |

In Table 1, the individual first-party identifiers are double encrypted. The event data may or may not be encrypted as well. The event data includes [content identifier, click value, timestamp] where the content identifier uniquely identifies a digital content item, the click value is a binary value that indicates whether or not the user clicked on the digital content item identified by the content identifier, and the timestamp indicates the date and time at which the event was logged. For example, the user associated with EncrFP.ID1 clicked on contentID12 at time t1 but did not click on contentID25 at time t2.

Similarly, in Table 2, the individual third-party identifiers are double encrypted. The event data may or may not be encrypted as well. The event data includes [content identifier, click value, timestamp] where the content identifier uniquely identifies a digital content item, the click value is a binary value that indicates whether or not the user clicked on the digital content item identified by the content identifier, and the timestamp indicates the date and time at which the event was logged. In the illustration, the user associated with EncrTP.ID1 is also the same user as Encr.FP.ID1 because the identifier values (ID1) both match. The third-party data set indicates that the user associated with EncrTP.ID1 did not click on either contentID33 or contentID64.

As shown by Table 3, join logic 306 produces a result of the intersection of the first-party data set of Table 1 and the third-party data set of Table 2. Since the third-party data set does not contain a record that matches the encrypted identifier EncrFP.ID3, the EncrFP.ID3 from the first-party data set is not included in the joined data set. The individual identifiers are double-encrypted so that, when the joined data set is sent back to the first-party system and/or the third-party system, neither the first-party system nor the third-party system can identify the individual users associated with the joined event data. For example, the first-party system and the third-party system can each determine, based on the joined data set, that a user (whose identifier is unknown to the first-party system because it is double-encrypted) clicked on contentID12 and that same user (whose identifier is double-encrypted) did not click on contentID33 or contentID64. The first-party system will not be able to determine the user's individual identity because the identifier is double-encrypted. This is because neither the first party's private key nor the third party's private key (which are different from each other and not shared between the parties) can decrypt the double-encrypted identifier. However, the unencrypted data, which is rendered anonymous by the double encryption process described, can be accessed by the first-party system and/or the third-party system.

Join logic 306 outputs joined double-encrypted data set 308. Double-encrypted data set 308 includes double-encrypted individual identifiers and associated event data that is either in plaintext or also double-encrypted.

Query processor 154 can output the joined double-encrypted data set 308 directly to the first-party application system and/or the third-party application system. Alternatively or in addition, query processor can perform one or more subsequent operations on joined double-encrypted data set 308 using, for example, aggregation logic 310, privacy logic 314, and/or masking logic 318, and then provide the output of those operations to the first-party application system and/or the third-party application system. The outputs produced by query processor 154 can be used by the first-party application system and/or the third-party application system for machine learning model training, to control one or more downstream operations, or for monitoring and reporting purposes.

Aggregation logic 310 generates aggregate-level metrics data 312 based on the joined double-encrypted data set 308. For example, aggregation logic 310 removes the encrypted identifier data from the joined data set 308 and generates a count based on one or more columns of the event metadata, such as a group-level identifier, a content identifier, or a campaign identifier. Using Table 3 as an example, aggregation logic 310 could output as aggregate metrics data 312 a count of 2 for ContentID12. In this example, the aggregate data produced by aggregation logic 310 is the count of 2 and not the individual events that add up to the sum of 2, so that the event-level data is not exposed.

Aggregation logic 310 is configured to operate on plaintext, encrypted data, or double-encrypted data. For example, if event metadata such as a group identifier is in plaintext in the joined double-encrypted data set 308, aggregation logic 310 can encrypt the metadata a single time, if needed for k-anonymity, for example, and then perform an aggregation on the single-encrypted event metadata. Examples of operations that can be performed by aggregation logic 310 on plaintext, single-encrypted data, or double-encrypted data include addition and multiplication.

Aggregation logic 310 outputs aggregate metrics data 312 to the first-party application system and/or the third-party application system. The outputs produced by aggregation logic can be used by the first-party application system and/or the third-party application system for machine learning model training, to control one or more downstream operations, or for monitoring and reporting purposes.

Privacy logic 314 applies a differential privacy algorithm to joined double-encrypted data set 308. Privacy logic 314 is configured to protect individual identities from differential attacks through which the identities could be exposed through query repetition. An example of a differential attack is when the same query is repeated multiple times on slightly different data sets and hidden or removed data can be deduced based on a comparison of the query results. For example, if a join is executed on a first data set and a second data set that contains ten rows, and then the another join is executed on the same first data set and a third data set that is a modified version of the second data set that has one of the ten rows removed, a comparison of the outputs of the two join operations could reveal the row that was removed from the second data set.

Privacy logic 314 adds differential privacy to the joined double-encrypted data set 308 within the trusted execution environment 152, and then releases a noisy version of the data set 308, privatized event data 316, to the first-party application system and/or the third-party application system. To add noise to joined double-encrypted data set 308, privacy logic 314 uses, for example, Laplace noise or Gaussian noise. In some implementations, privacy logic 314 performs other privatization operations alternatively or in addition to differential privacy, including random bit flipping, holdout, or k-anonymity.

As shown in FIG. 3, masking logic 318a, 318b can be applied to the first double-encrypted data 302 or second double-encrypted data 304, by a first-party system back end and/or a third-party system back end, as the case may be, in order to add additional or alternative privacy protections prior to the ingestion of such data into the trusted execution environment 152. Masking logic 318a, 318b masks (e.g., adds fake records to) the event-level data sets before they are provided to the trusted execution environment 152 to be processed by one or more components of query processor 154. The operation of query processor 154 can unmask the data only for the purposes of performing the join logic 306. That is, after masking, an outside observer (e.g., external to the trusted execution environment) will not be able to determine which records were fake or real during the creation of the joined double-encrypted data set 308. As a result, the output of aggregation logic 310, privacy logic 314, and/or labeling logic 322 are also masked.

Masking logic 318a, 318b is applied to the double encrypted data before it enters the trusted execution environment 152. During the masking process, the first party system or the third party system, as the case may be, creates a large number of fake event records and adds a bit to each record such that the value of the bit indicates whether the record is real or fake. The bit is homomorphically encrypted. When the masked double encrypted data enters the trusted execution environment, the join logic cannot determine which events are real or not, because the bit is homomorphically encrypted, and must operate on all of the data records.

Figure 4A:
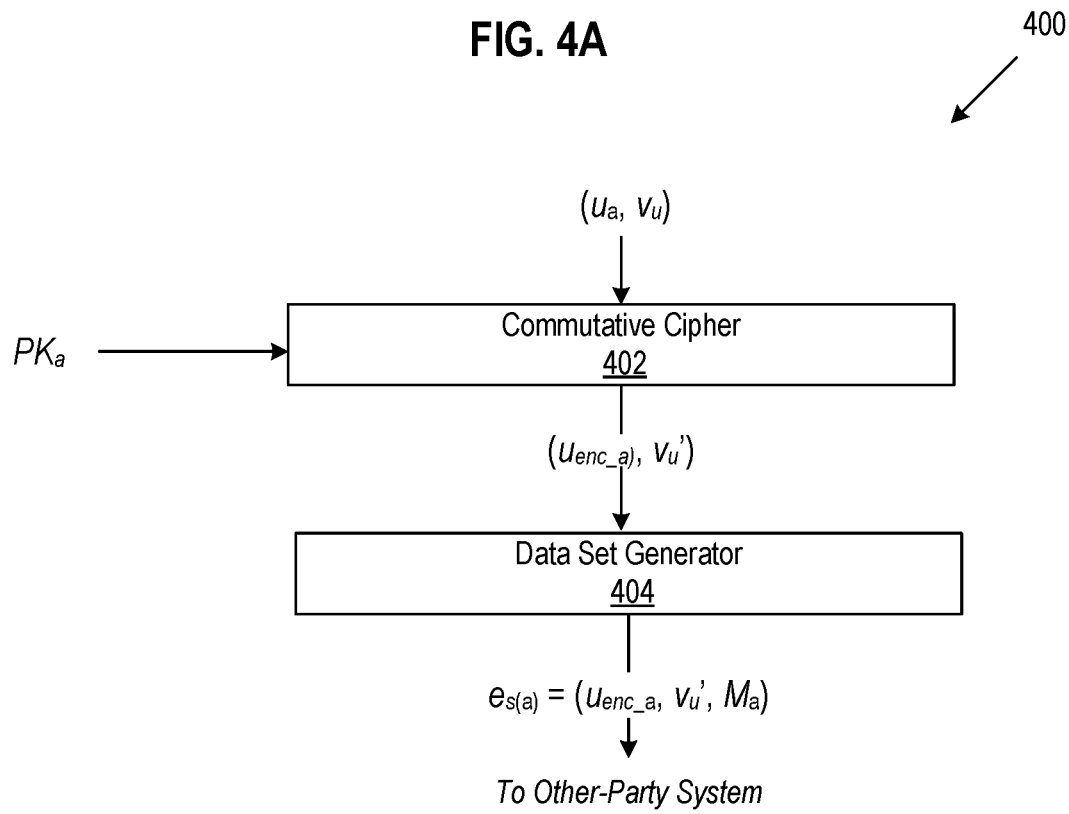
FIG. 4A is a flow diagram of an example method 400 to implement an encryption system for a private multi-party computation in accordance with some embodiments of the present disclosure.
Figure 4B:
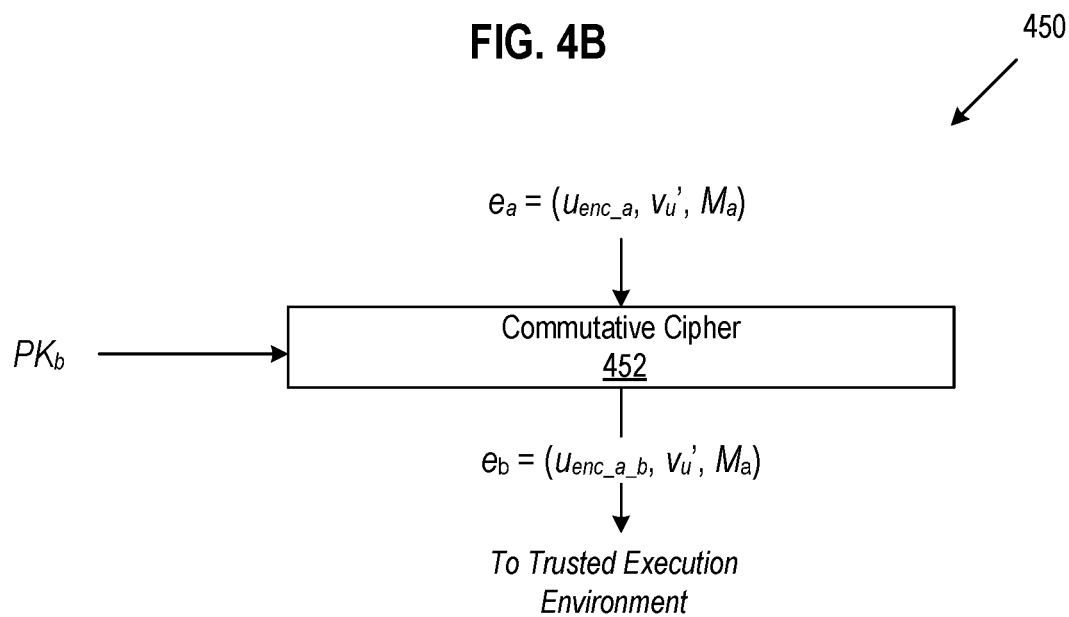
FIG. 4B is a flow diagram of an example method 450 to implement an encryption system for a private multi-party computation in accordance with some embodiments of the present disclosure.

As shown in FIG. 3, each party can optionally apply masking logic 318a, 318b, to add a large number of fake event records to its respective data set, where the identifiers of the fake event records are also single-encrypted (such as from encryption system 132) by that party using a commutative cipher as shown in FIG. 4A or FIG. 4B, for example. Masking logic 318a, 318b are shown in dashed lines to indicate that the masking logic 318a and/or 318b can be omitted from some embodiments. Masking logic 318a, 318b adds fake rows of $(u_{enc}, v_u')$ to a party's respective data set, where $u_{enc}$ denotes an encrypted individual identifier, $v_u'$ denotes a privatized version of v, and v denotes a vector of access-restricted information associated with u that has not been privatized, before sending the data set to the trusted execution environment.

In some implementations of masking logic 318a and/or 318b, every single record of $(u_{enc}, v_u')$ is assigned, by the respective party, a homomorphic-encrypted bit (e.g., 1=real, 0=fake) that is only known to that party, before the party sends the data into the trusted execution environment 152, such that only the party assigning the bit can distinguish fake records from real records in the data set, and the other party and the neutral party (e.g., the trusted execution environment 152) cannot distinguish fake records from real records in the data set. Consequently, the trusted execution environment 152 will need to operate on all of the (real and fake) records in the data set it receives.

The first-party system and the third-party system can use the same masking logic or different masking logic. However, the keys used by the first-party system and the third-party system to perform the homomorphic encryption on the bit are different and not shared.

For purposes of performing the join logic, a homomorphic private set intersection operation can be done in the trusted execution environment 152 on the joined double-encrypted data set 308 to directly unmask the false individual data records, if needed for aggregation or other post-join operations. This is possible because the homomorphic private set intersection operation will not reveal the nature of the overlap between the joined data sets (i.e., the trusted execution environment will be unable to differentiate whether an unmatched record is due to the lack of overlap between the two $u_{enc}$ identity spaces, or because one side of the join is trying to match on a fake identity).

The homomorphic private set intersection can be done by, for example, performing a MULTIPLY operation between each party's homomorphically encrypted bit, which translates to an unencrypted AND operation. If any party's bit is 0, then the result would yield a homomorphically encrypted 0 bit, which can be decrypted and then removed from the final result. This is because there is no commutative identity overlap (either or both party's bit is 0), or because the records are unmatched due to masking (one or both party's bit is 0). Only if both parties' bits are 1 will the resultant encrypted bit be 1, in which case the record should not be removed from the joined data set, and as such, ultimately it can be fed into the aggregation logic 310, privacy logic 314 for further privatization, or used in labeling logic 322.

In some implementations, query processor applies labeling logic 322 to joined double-encrypted data set 308 or to the output of one or more of the other components of query processor 154. Labeling logic 322 is used to, for example, prepare joined double-encrypted data set 308 for use in machine learning model training, fine tuning, or optimization, or for monitoring or reporting.

For example, a label 1 can represent a positive example (e.g., indicating that an event occurred, such as a click or conversion event) or a negative example (e.g., indicating that an event did not occur) for a particular individual identifier given the associated event metadata. Labeling logic 322 drops $u_{enc\_ab}$ from the joined data set after the query processing operations have been performed, but keeps $v_u'$, the privatized vector of event data, and adds the appropriate label based on the event data. For first-party event level data, labeling logic 322 outputs, for example, ($v_u$, noisy(1), M). For joined first and third-party event level data, labeling logic 322 outputs ($v_u'$, 1, noisy(M)). As noted above, M is a set of non-private event metadata associated with an event. Using noisy(M) prevents M from being used to map one event data stream back to another as a form of re-identification.

FIG. 4A and FIG. 4B collectively represent a framework that executes a sequence of rounds between a first-party application software system back end and a third-party application software back end, through which data is encrypted, sent to the other party back end, encrypted a second time, and then sent to a trusted execution environment.

FIG. 4A is a flow diagram of an example method 400 to implement an encryption system for a private multi-party computation in accordance with some embodiments of the present disclosure.

The method 400 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the encryption system 132 or the encryption system 142 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 4A, a is used to denote a first application software system back end, whether it be a back end portion of a first-party application software system or a third-party application software system. At the first application software back end, denoted as a, a data set ($u_a$, $v_u$) is input to a commutative cipher 402, which resides on a's system. As noted above, u denotes a joinable individual identifier, and $v_u$ denotes a user-specific vector of non-public or non-access-restricted information associated with u that has not been privatized.

Commutative cipher 402 is, for example, a commutative exponentiation cipher such as Pohlig-Hellman. Commutative cipher 402 outputs an encrypted data set ($u_{enc\_a}$, $v_u'$) such that $v_u'$ in isolation cannot map back to $v_u$ reliably. As above, $u_{enc\_a}$ denotes an encrypted individual identifier encrypted with a's private key $PK_a$, and $v_u'$ denotes a privatized version of $v_u$. In some implementations, $v_u$ is a group identifier and $v_u'$ is a hashed version of $v_u$.

The encrypted individual identifier $u_{enc\_a}$ is generated using a private key $PK_a$ that is known to the first application software back end only and is not share with the other party back end. Commutative cipher 402 sends the encrypted data set ($u_{enc\_a}$, $v_u'$) to data set generator 404.

The encrypted data set ($u_{enc\_a}$, $v_u'$) is input to data set generator 404, also hosted at a's system. Data set generator 404 generates an event level dataset $e_a$=($u_{enc\_a}$, $v_u'$, $M_a$) based on the encrypted data set ($u_{enc\_a}$, $v_u'$). The event-level data set $e_a$ is a set that contains event data for users of a's application software, and M is a set of non-private metadata associated with a's event data, such as a group identifier, one or more features, and/or public metadata. To create the event level data set $e_a$, data set generator 404 associates the encrypted individual identifier $u_{enc\_a}$ with a's non-private metadata $M_a$.

The other party, for example the third-party back end if the first-party back end is a, above, performs a similar transformation using a corresponding commutative cipher 402 on b's system to encrypt ($u_b$) and a corresponding data set generator 404 hosted on b's system to produce ($u_{enc\_b}$, $M_b$), where b denotes a different party than a. The commutative cipher 402 at b's system uses b's private key $PK_b$ to perform the encryption. The data set generator 404 at b's system associates the list of encrypted events with non-private metadata. In some implementations, the other party b does not generate $v_u'$.

FIG. 4B is a flow diagram of an example method 450 to implement an encryption system for a private multi-party computation in accordance with some embodiments of the present disclosure.

The method 450 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the encryption system 132 or the encryption system 142 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

Following the processes illustrated by FIG. 4A, Each of the parties a, b shares their respective encrypted generated data with the other party, and each party performs a second encryption on the encrypted individual identifier using their own private key. FIG. 4B illustrates an example in which b's system receives and double-encrypts the encrypted data generated by a. For example, system b receives $e_a$=($u_{enc\_a}$, $v_u'$, $M_a$) from system a, and applies its commutative cipher 452 to $u_{enc\_a}$ using its own private key $PK_b$ to produce $u_{enc\_a\_b}$.

The other-party system, a, receives and double-encrypts the encrypted data generated by b in a similar manner. For example, system a receives $e_b$=($u_{enc\_b}$, $M_b$) from system b, and applies its commutative cipher 452 to $u_{enc\_b}$ using its own private key $PK_a$ to produce $u_{enc\_b\_a}$. Because a commutative cipher is used, $u_{enc\_ab}$=$u_{enc\_a\_b}$=$u_{enc\_b\_a}$, such that the order of encryption operations does not matter.

In some implementations, one of the parties a or b is the trusted execution environment. In these implementations, trusted execution environment 152 contains a commutative cipher.

The private keys $PK_b$ and $PK_a$ are generated separately on different back end systems and are not shared with the other-party system or with the trusted execution environment. In some implementations $PK_a$ and $PK_b$ are generated separately and independently at the first-party and third-party back end servers. However, in some implementations, the same root or seed value, for example, the same prime number or value on the same elliptic curve cryptosystem, is used as a seed to generate both $PK_b$ and $PK_a$. The private keys $PK_b$ and $PK_a$ are generated at the back end and not by the front end apps or browser.

After each party a, b, has double-encrypted the other party's encrypted identifier, both parties send their respective double-encrypted data to the trusted execution environment. Because none of the parties, i.e., none of a, b, or the trusted execution environment, have access to all of the private keys at any single point in time, reidentification risk is mitigated.

FIG. 5 is a flow diagram of an example method 500 for private multi-party computation in accordance with some embodiments of the present disclosure.

The method 500 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the software and/or hardware service, e.g., trusted computing environment, of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 502, the processing device creates a software and/or hardware service, e.g., a trusted execution environment, at a computing system. For example, the processing device creates a secure virtual machine at a trusted computing system containing hardware configured for secure in-memory processing as described above with reference to FIG. 1. Dashed lines are used in FIG. 5 to illustrate that operation 502 is optional, i.e., included in some implementations but omitted in other implementations. For example, in some implementations, the service, e.g., trusted execution environment, already exists prior to the method 500, in which case operation 502 is omitted or skipped.

At operation 504, the processing device receives, from a first-party application server, first double-encrypted data. In some implementations, the first double-encrypted data is received by a service, e.g., received into a trusted execution environment. For example, the processing device performs operations described above with reference to FIG. 2 and FIG. 3 with respect to communications between the first-party application server and the trusted execution environment. In some implementations, an instance of the first double-encrypted data includes a double-encrypted third-party individual identifier and third-party event data. In some implementations, the double-encrypted first-party individual identifier is encrypted a first time at the first-party application server using the first-party private key and a second time at a third-party application server using the third-party private key. In some implementations, the first-party event data is encrypted a first time at the first-party application server using the first-party private key and a second time at the third-party application server using the third-party private key.

At operation 506, the processing device receives, from a third-party application server, second double-encrypted data. In some implementations, the second double-encrypted data is received by the service, e.g., into the trusted execution environment. For example, the processing device performs operations described above with reference to FIG. 2 and FIG. 3 with respect to communications between the third-party application server and the trusted execution environment. In some implementations, an instance of the second double-encrypted data includes a double-encrypted first-party individual identifier and first-party event data.

In some implementations, the double-encrypted third-party individual identifier is encrypted a first time at a third-party application server using a third-party private key and a second time at the first-party application server using a first-party private key. In some implementations, the third-party event data is encrypted a first time at the third-party application server using the third-party private key and a second time at the first-party application server using the first-party private key. In some implementations, the first-party private key is not accessible by the third-party application server or the trusted execution environment, and the third-party private key is not accessible by the first-party application server or the trusted execution environment. In some implementations, the first-party private key is generated at the first-party application server using a seed, and the third-party private key is generated at the third-party application server using the same seed.

In some implementations, the first-party application server encrypts the first-party individual identifier using a first commutative cipher, and the third-party application server encrypts the encrypted first-party individual identifier using a second commutative cipher. In some implementations, the third-party application server encrypts the third-party individual identifier using the second commutative cipher, and the first-party application server encrypts the encrypted third-party individual identifier using the first commutative cipher.

In some implementations, at least one of the first-party event data or the third-party event data includes at least one of: group identifier data, click data, conversion data, health-care data, financial data, or training data for a machine learning model. In some implementations, at least a portion of the query-processed double-encrypted data set is used by the at least one of the first-party application server or the third-party application server to control an automated process.

At operation 508, the processing device executes a query on the first double-encrypted data and the second double encrypted data to create a query-processed double-encrypted data set. In some implementations, executing the query includes creating a joined data set comprising the first double-encrypted data and the second double encrypted data using the double-encrypted first-party individual identifier or the double-encrypted third-party individual identifier as a join key. In some implementations, operation 508 is performed by the service, e.g., in the trusted execution environment.

In some implementations, executing the query includes removing the double-encrypted first-party individual identifier and the double-encrypted third-party individual identifier from the joined data set, and generating an aggregate metric based on at least one of first-party event data in the joined data set or third-party event data in the joined data set. In some implementations, sending the portion of the query-processed double-encrypted data set includes sending the aggregate metric to the at least one of the first-party application server or the third-party application server.

In some implementations, the processing device applies a differential privacy algorithm to the portion of the query-processed double-encrypted data set to produce a differentially-private double-encrypted data set, and sends the differentially-private double-encrypted data set (instead of the portion of the query-processed double-encrypted data set) to the at least one of the first-party application server or the third-party application server.

At operation 510, the processing device determines whether to perform any additional processing. For example, the processing device determines whether a data request contains a request for event-level data or aggregate data metrics. If the processing device is to perform additional processing, the processing device proceeds to operation 512. If the processing device is not to perform additional processing, the processing device proceeds to operation 514.

At operation 512, the processing device additional processing on the query-processed double-encrypted data set. For example, the processing device executes aggregation logic, privacy logic, masking logic, or labeling logic as described above with reference to FIG. 3. In some implementations, operation 512 is performed by the service, e.g., in the trusted execution environment. After performing additional processing, the processing device returns to operation 510.

At operation 514, the processing device sends at least a portion of the query-processed double-encrypted data set to the first-party application server and/or the third-party application server. For example, the processing device sends event-level double-encrypted data or aggregate-level metrics data to the first-party application server and/or the third-party application server. The first-party application server and/or the third-party application server can use the received data set to, for example, determine downstream decisions, train a machine learning model, or to perform monitoring or reporting functions. In some implementations, operation 514 is performed by the service, e.g., by the trusted execution environment, and the first-party application server and/or the third-party application server receive data from the service (e.g., the trusted execution environment).

FIG. 6 illustrates an example machine of a computer system 600 within which a set of instructions, for causing the machine to perform any of the methodologies discussed herein, can be executed. In some embodiments, the computer system 600 can correspond to a component of a networked computer system (e.g., the computer system 100 of FIG. 1) that includes, is coupled to, or utilizes a machine to execute an operating system to perform operations corresponding to the trusted execution environment of FIG. 1.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a memory 606 (e.g., flash memory, static random access memory (SRAM), etc.), an input/output system 610, and a data storage system 640, which communicate with each other via a bus 630.

Processing device 602 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be at least one special-purpose processing device such as an application specific integrated circuit (ASIC), a field programmable gate array (FPGA), a digital signal processor (DSP), network processor, or the like. The processing device 602 is configured to execute instructions 612 for performing the operations and steps discussed herein.

Instructions 612 include portions of the software and/or hardware service, e.g., the trusted execution environment, when processing device is executing those portions of the trusted execution environment 650. Thus, the trusted execution environment is shown in dashed lines as part of instructions 612 to illustrate that, at times, portions of the trusted execution environment are executed by processing device 602. For example, when at least some portion of the trusted execution environment is embodied in instructions to cause processing device 602 to perform the method(s) described above, some of those instructions can be read into processing device 602 (e.g., into an internal cache or other memory) from main memory 604 and/or data storage system 640. However, it is not required that all of the trusted execution environment be included in instructions 612 at the same time and portions of the trusted execution environment are stored in at least one other component of computer system 600 at other times, e.g., when at least one portion of the trusted execution environment are not being executed by processing device 602.

The computer system 600 further includes a network interface device 608 to communicate over the network 620. Network interface device 608 provides a two-way data communication coupling to a network. For example, network interface device 608 can be an integrated-services digital network (ISDN) card, cable modem, satellite modem, or a modem to provide a data communication connection to a corresponding type of telephone line. As another example, network interface device 608 can be a local area network (LAN) card to provide a data communication connection to a compatible LAN. Wireless links can also be implemented. In any such implementation network interface device 608 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 600.

Computer system 600 can send messages and receive data, including program code, through the network(s) and network interface device 608. In the Internet example, a server can transmit a requested code for an application program through the Internet and network interface device 608. The received code can be executed by processing device 602 as it is received, and/or stored in data storage system 640, or other non-volatile storage for later execution.

The input/output system 610 includes an output device, such as a display, for example a liquid crystal display (LCD) or a touchscreen display, for displaying information to a computer user, or a speaker, a haptic device, or another form of output device. The input/output system 610 can include an input device, for example, alphanumeric keys and other keys configured for communicating information and command selections to processing device 602. An input device can, alternatively or in addition, include a cursor control, such as a mouse, a trackball, or cursor direction keys for communicating direction information and command selections to processing device 602 and for controlling cursor movement on a display. An input device can, alternatively or in addition, include a microphone, a sensor, or an array of sensors, for communicating sensed information to processing device 602. Sensed information can include voice commands, audio signals, geographic location information, and/or digital imagery, for example.

The data storage system 640 includes a machine-readable storage medium 642 (also known as a computer-readable medium) on which is stored at least one set of instructions 644 or software embodying any of the methodologies or functions described herein. The instructions 644 can also reside, completely or at least partially, within the main memory 604 and/or within the processing device 602 during execution thereof by the computer system 600, the main memory 604 and the processing device 602 also constituting machine-readable storage media.

In one embodiment, the instructions 644 include instructions to implement functionality corresponding to a trusted execution environment (e.g., the trusted execution environment 152 of FIG. 1).

Dashed lines are used in FIG. 6 to indicate that it is not required that the trusted execution environment be embodied entirely in instructions 612, 614, and 644 at the same time. In one example, portions of the trusted execution environment are embodied in instructions 644, which are read into main memory 604 as instructions 614, and portions of instructions 614 are read into processing device 602 as instructions 612 for execution. In another example, some portions of the trusted execution environment are embodied in instructions 644 while other portions are embodied in instructions 614 and still other portions are embodied in instructions 612.

While the machine-readable storage medium 642 is shown in an example embodiment to be a single medium, the term "machine-readable storage medium" should be taken to include a single medium or multiple media that store the at least one set of instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media.

FIG. 7 illustrates an example machine of a computer system 700 within which a set of instructions, for causing the machine to perform any of the methodologies discussed herein, can be executed. In some embodiments, the computer system 700 can correspond to a component of a networked computer system (e.g., the computer system 100 of FIG. 1) that includes, is coupled to, or utilizes a machine to execute an operating system to perform operations corresponding to the encryption system 132 or the encryption system 142 of FIG. 1.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a memory 706 (e.g., flash memory, static random access memory (SRAM), etc.), an input/output system 710, and a data storage system 740, which communicate with each other via a bus 730.

Processing device 702 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be at least one special-purpose processing device such as an application specific integrated circuit (ASIC), a field programmable gate array (FPGA), a digital signal processor (DSP), network processor, or the like. The processing device 702 is configured to execute instructions 712 for performing the operations and steps discussed herein.

In FIG. 7, encryption system 750 represents either the encryption system 132 or the encryption system 142. Instructions 712 include portions of encryption system 750 when those portions of the encryption system 750 are being executed by processing device 702. Thus, similar to the description above, the encryption system 750 is shown in dashed lines as part of instructions 712 to illustrate that, at times, portions of the encryption system 750 are executed by processing device 702. For example, when at least some portion of the encryption system 750 is embodied in instructions to cause processing device 702 to perform the method(s) described above, some of those instructions can be read into processing device 702 (e.g., into an internal cache or other memory) from main memory 704 and/or data storage system 740. However, it is not required that all of the encryption system 750 be included in instructions 712 at the same time and portions of the encryption system 750 are stored in at least one other component of computer system 700 at other times, e.g., when at least one portion of the encryption system 750 are not being executed by processing device 702.

The computer system 700 further includes a network interface device 708 to communicate over the network 720.

Network interface device 708 provides a two-way data communication coupling to a network. For example, network interface device 708 can be an integrated-services digital network (ISDN) card, cable modem, satellite modem, or a modem to provide a data communication connection to a corresponding type of telephone line. As another example, network interface device 708 can be a local area network (LAN) card to provide a data communication connection to a compatible LAN. Wireless links can also be implemented. In any such implementation network interface device 708 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 700.

Computer system 700 can send messages and receive data, including program code, through the network(s) and network interface device 708. In the Internet example, a server can transmit a requested code for an application program through the Internet and network interface device 708. The received code can be executed by processing device 702 as it is received, and/or stored in data storage system 740, or other non-volatile storage for later execution.

The input/output system 710 includes an output device, such as a display, for example a liquid crystal display (LCD) or a touchscreen display, for displaying information to a computer user, or a speaker, a haptic device, or another form of output device. The input/output system 710 can include an input device, for example, alphanumeric keys and other keys configured for communicating information and command selections to processing device 702. An input device can, alternatively or in addition, include a cursor control, such as a mouse, a trackball, or cursor direction keys for communicating direction information and command selections to processing device 702 and for controlling cursor movement on a display. An input device can, alternatively or in addition, include a microphone, a sensor, or an array of sensors, for communicating sensed information to processing device 702. Sensed information can include voice commands, audio signals, geographic location information, and/or digital imagery, for example.

The data storage system 740 includes a machine-readable storage medium 742 (also known as a computer-readable medium) on which is stored at least one set of instructions 744 or software embodying any of the methodologies or functions described herein. The instructions 744 can also reside, completely or at least partially, within the main memory 704 and/or within the processing device 702 during execution thereof by the computer system 700, the main memory 704 and the processing device 702 also constituting machine-readable storage media.

In one embodiment, the instructions 744 include instructions to implement functionality corresponding to an encryption system (e.g., the encryption system 132 or the encryption system 142 of FIG. 1).

Dashed lines are used in FIG. 7 to indicate that it is not required that the encryption system be embodied entirely in instructions 712, 714, and 744 at the same time. In one example, portions of the encryption system are embodied in instructions 744, which are read into main memory 704 as instructions 714, and portions of instructions 714 are read into processing device 702 as instructions 712 for execution. In another example, some portions of the encryption system are embodied in instructions 744 while other portions are embodied in instructions 714 and still other portions are embodied in instructions 712.

While the machine-readable storage medium 742 is shown in an example embodiment to be a single medium, the term "machine-readable storage medium" should be taken to include a single medium or multiple media that store the at least one set of instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the above-described computer-implemented methods 200, 300, 500, 600, in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In an example 1, a method includes, optionally, creating a trusted execution environment at a computing system. In the example 1, the method includes receiving, from a first-party application server, first double-encrypted data, receiving, from a third-party application server, second double-encrypted data, executing a query on the first double-encrypted data and the second double encrypted data to create a query-processed double-encrypted data set, and sending a portion of the query-processed double-encrypted data set to at least one of the first-party application server or the third-party application server. In some implementations, the method of example 1 is performed by a software and/or hardware service, e.g., a trusted execution environment.

An example 2 includes the subject matter of example 1, where an instance of the first double-encrypted data includes a double-encrypted third-party individual identifier and unencrypted third-party event data; and an instance of the second double-encrypted data includes a double-encrypted first-party individual identifier and unencrypted first-party event data. An example 3 includes the subject matter of example 2, where the double-encrypted third-party individual identifier is encrypted a first time at the third-party application server using a third-party private key and a second time at the first-party application server using a first-party private key; and the double-encrypted first-party individual identifier is encrypted a first time at the first-party application server using the first-party private key and a second time at the third-party application server using the third-party private key. An example 4 includes the subject matter of example 3, where the third-party event data is encrypted a first time at the third-party application server using the third-party private key and a second time at the first-party application server using the first-party private key; and the first-party event data is encrypted a first time at the first-party application server using the first-party private key and a second time at the third-party application server using the third-party private key. An example 5 includes the subject matter of example 4, where the first-party private key is not accessible by the third-party application server or the trusted execution environment; and the third-party private key is not accessible by the first-party application server or the trusted execution environment. An example 6 includes the subject matter of example 4, where the first-party private key is generated at the first-party application server using a seed; and the third-party private key is generated at the third-party application server using the seed. An example 7 includes the subject matter of example 3, where the first-party application server encrypts the first-party individual identifier using a first commutative cipher; and the third-party application server encrypts the encrypted first-party individual identifier using a second commutative cipher. An example 8 includes the subject matter of example 7, where: the third-party application server encrypts the third-party individual identifier using the second commutative cipher; and the first-party application server encrypts the encrypted third-party individual identifier using the first commutative cipher. An example 9 includes the subject matter of example 2, where executing the query includes creating a joined data set including the first double-encrypted data and the second double encrypted data using the double-encrypted first-party individual identifier or the double-encrypted third-party individual identifier as a join key. In some implementations, the query is executed within a software and/or hardware service, e.g., a trusted execution environment. An example 10 includes the subject matter of example 9, where executing the query includes (i) removing the double-encrypted first-party individual identifier and the double-encrypted third-party individual identifier from the joined data set, and (ii) generating an aggregate metric based on at least one of first-party event data in the joined data set or third-party event data in the joined data set; and sending the portion of the query-processed double-encrypted data set includes sending the aggregate metric to the at least one of the first-party application server or the third-party application server. In some implementations, example 10 includes operations performed using a software and/or hardware service, e.g., the trusted execution environment. An example 11 includes the subject matter of any of examples 1-9, further including: applying a differential privacy algorithm to the portion of the query-processed double-encrypted data set to produce a differentially private double-encrypted data set; and sending the differentially private double-encrypted data set and not the portion of the query-processed double-encrypted data set to the at least one of the first-party application server or the third-party application server. An example 12 includes the subject matter of any of examples 1-11, where the first double-encrypted data is received into a trusted execution environment from a first-party application server; the second double-encrypted data is received into the trusted execution environment from a third-party application server; and the query is executed, in the trusted execution environment, on the first double-encrypted data and the second double-encrypted data to create a query-processed double-encrypted data set.

In an example 13, a system includes at least one memory; and at least one processor coupled to the at least one memory; where the at least one memory includes instructions that, when executed by the at least one processor cause the at least one processor to perform operations including: creating first double-encrypted data; sending the first double-encrypted data into a trusted execution environment; receiving, from the trusted execution environment, a query-processed double-encrypted data set; the trusted execution environment receives the first double-encrypted data, receives second double encrypted data, and executes a query on the first double-encrypted data and the second double encrypted data to create the query-processed double-encrypted data set.

An example 14 includes the subject matter of example 13, where an instance of the first double-encrypted data includes a double-encrypted third-party individual identifier and unencrypted third-party event data; and an instance of the second double-encrypted data includes a double-encrypted first-party individual identifier and unencrypted first-party event data. An example 15 includes the subject matter of example 14, where the double-encrypted third-party individual identifier is encrypted a first time at a third-party application server using a third-party private key and a second time at a first-party application server using a first-party private key; and the double-encrypted first-party individual identifier is encrypted a first time at the first-party application server using the first-party private key and a second time at the third-party application server using the third-party private key. An example 16 includes the subject matter of example 15, where the third-party event data is encrypted a first time at the third-party application server using the third-party private key and a second time at the first-party application server using the first-party private key; and the first-party event data is encrypted a first time at the first-party application server using the first-party private key and a second time at the third-party application server using the third-party private key. An example 17 includes the subject matter of example 16, where the first-party private key is not accessible by the third-party application server or the trusted execution environment; and the third-party private key is not accessible by the first-party application server or the trusted execution environment. An example 18 includes the subject matter of example 16, where the first-party private key is generated at the first-party application server using a seed; and the third-party private key is generated at the third-party application server using the seed. An example 19 includes the subject matter of example 14, where the first-party application server encrypts the first-party individual identifier using a first commutative cipher; and the third-party application server encrypts the encrypted first-party individual identifier using a second commutative cipher. An example 20 includes the subject matter of example 19, where the third-party application server encrypts the third-party individual identifier using the second commutative cipher; and the first-party application server encrypts the encrypted third-party individual identifier using the first commutative cipher.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
receiving, from a first-party application server, first double-encrypted data;
receiving, from a third-party application server, second double-encrypted data;
executing a query on the first double-encrypted data and the second double-encrypted data to create a query-processed double-encrypted data set, wherein executing the query comprises creating a joined data set comprising the first double-encrypted data and the second double-encrypted data using a double-encrypted first-party individual identifier or a double-encrypted third-party individual identifier as a join key; and
sending a portion of the query-processed double-encrypted data set to at least one of the first-party application server or the third-party application server.

2. The method of claim 1, wherein:
an instance of the first double-encrypted data comprises a double-encrypted third-party individual identifier and unencrypted third-party event data; and
an instance of the second double-encrypted data comprises a double-encrypted first-party individual identifier and unencrypted first-party event.

3. The method of claim 2, wherein:
the double-encrypted third-party individual identifier comprises a third-party individual identifier encrypted a first time at the third-party application server using a third-party private key and a second time at the first-party application server using a first-party private key; and
the double-encrypted first-party individual identifier comprises a first-party individual identifier encrypted a first time at the first-party application server using the first-party private key and a second time at the third-party application server using the third-party private key.

4. The method of claim 3, wherein:
third-party event data is encrypted a first time at the third-party application server using the third-party private key and a second time at the first-party application server using the first-party private key; and
first-party event data is encrypted a first time at the first-party application server using the first-party private key and a second time at the third-party application server using the third-party private key.

5. The method of claim 4, wherein:
the first-party private key is not accessible by the third-party application server; and
the third-party private key is not accessible by the first-party application server.

6. The method of claim 4, wherein:
the first-party private key is generated at the first-party application server using a seed; and
the third-party private key is generated at the third-party application server using the seed.

7. The method of claim 3, wherein:
the first-party application server encrypts the first-party individual identifier using a first commutative cipher; and
the third-party application server encrypts the encrypted first-party individual identifier using a second commutative cipher.

8. The method of claim 7, wherein:
the third-party application server encrypts the third-party individual identifier using the second commutative cipher; and
the first-party application server encrypts the encrypted third-party individual identifier using the first commutative cipher.

9. The method of claim 1, wherein:
executing the query comprises (i) removing the double-encrypted first-party individual identifier and the double-encrypted third-party individual identifier from the joined data set, and (ii) generating an aggregate metric based on at least one of first-party event data in the joined data set or third-party event data in the joined data set; and sending the portion of the query-processed double-encrypted data set comprises sending the aggregate metric to the at least one of the first-party application server or the third-party application server.

10. The method of claim 1, further comprising:
applying a differential privacy algorithm to the portion of the query-processed double-encrypted data set to produce a differentially private double-encrypted data set; and
sending the differentially private double-encrypted data set and not the portion of the query-processed double-encrypted data set to the at least one of the first-party application server or the third-party application server.

11. The method of claim 1, wherein:
the first double-encrypted data is received into a trusted execution environment from a first-party application server;
the second double-encrypted data is received into the trusted execution environment from a third-party application server; and
the query is executed, in the trusted execution environment, on the first double-encrypted data and the second double-encrypted data to create a query-processed double-encrypted data set.

12. A system comprising:
at least one memory; and
at least one processor coupled to the at least one memory;
wherein the at least one memory comprises instructions that, when executed by the at least one processor cause the at least one processor to perform operations comprising:
creating first double-encrypted data;
sending the first double-encrypted data into a trusted execution environment;
receiving, from the trusted execution environment, a query-processed double-encrypted data set, wherein the trusted execution environment receives the first double-encrypted data, receives second double-encrypted data, and executes a query on the first double-encrypted data and the second double-encrypted data to create the query-processed double-encrypted data set, wherein executing the query comprises creating a joined data set comprising the first double-encrypted data and the second double-encrypted data using a double-encrypted first-party individual identifier or a double-encrypted third-party individual identifier as a join key.

13. The system of claim 12, wherein:
an instance of the first double-encrypted data comprises a double-encrypted third-party individual identifier and unencrypted third-party event data; and
an instance of the second double-encrypted data comprises a double-encrypted first-party individual identifier and unencrypted first-party event data.

14. The system of claim 13, wherein:
the double-encrypted third-party individual identifier is encrypted a first time at a third-party application server using a third-party private key and a second time at a first-party application server using a first-party private key; and
the double-encrypted first-party individual identifier is encrypted a first time at the first-party application server using the first-party private key and a second time at the third-party application server using the third-party private key.

15. The system of claim 12, wherein:
third-party event data is encrypted a first time at a third-party application server using a third-party private key and a second time at a first-party application server using a first-party private key; and
first-party event data is encrypted a first time at the first-party application server using the first-party private key and a second time at the third-party application server using the third-party private key.

16. The system of claim 15, wherein:
the first-party private key is not accessible by the third-party application server or the trusted execution environment; and
the third-party private key is not accessible by the first-party application server or the trusted execution environment.

17. The system of claim 15, wherein:
the first-party private key is generated at the first-party application server using a seed; and
the third-party private key is generated at the third-party application server using the seed.

18. The system of claim 14, wherein:
the first-party application server encrypts a first-party individual identifier using a first commutative cipher; and
the third-party application server encrypts the encrypted first-party individual identifier using a second commutative cipher.

19. The system of claim 18, wherein:
the third-party application server encrypts a third-party individual identifier using the second commutative cipher; and
the first-party application server encrypts the encrypted third-party individual identifier using the first commutative cipher.

20. A system comprising:
a memory; and
a processor coupled to the memory;
wherein the memory comprises instructions that when executed by the processor cause the processor to:
receive, from a first-party application server, first double-encrypted data;
receive, from a third-party application server, second double-encrypted data;
execute a query on the first double-encrypted data and the second double-encrypted data to create a query-processed double-encrypted data set, wherein executing the query comprises creating a joined data set comprising the first double-encrypted data and the second double-encrypted data using a double-encrypted first-party individual identifier or a double-encrypted third-party individual identifier as a join key; and
send a portion of the query-processed double-encrypted data set to at least one of the first-party application server or the third-party application server.

* * * * *